H. WHITESIDE.
FASTENING ATTACHMENT FOR SKID CHAINS.
APPLICATION FILED JUNE 24, 1920.
1,369,950.
Patented Mar. 1, 1921.
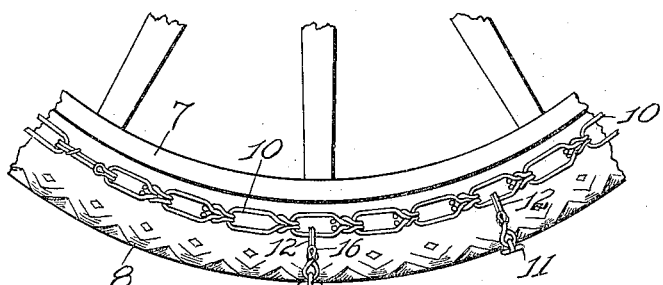
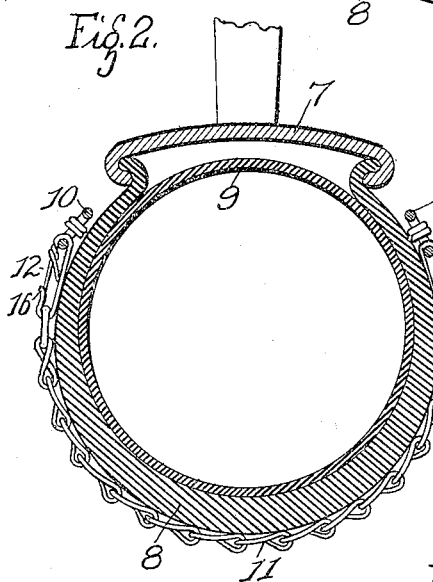
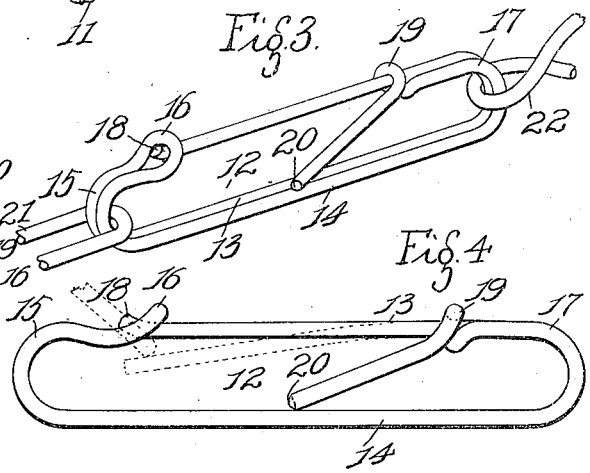
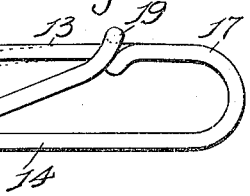
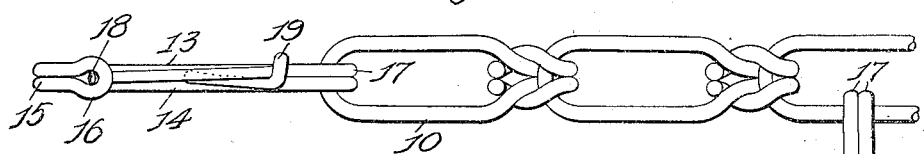
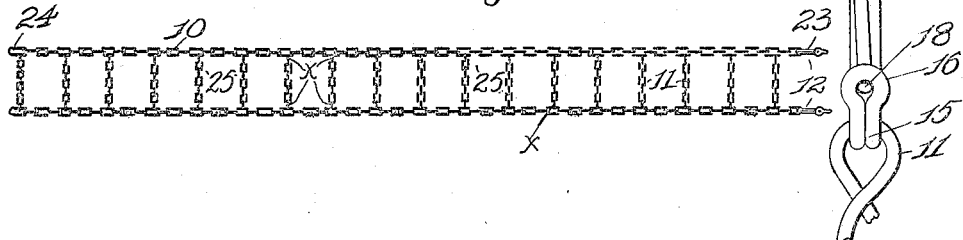
Inventor
Harry Whiteside

UNITED STATES PATENT OFFICE.

HARRY WHITESIDE, OF ST. LOUIS, MISSOURI.

FASTENING ATTACHMENT FOR SKID-CHAINS.

1,369,950.      Specification of Letters Patent.      Patented Mar. 1, 1921.

Application filed June 24, 1920. Serial No. 391,440.

*To all whom it may concern:*

Be it known that I, HARRY WHITESIDE, a citizen of the United States, and resident of St. Louis, State of Missouri, have invented certain new and useful Improvements in Fastening Attachments for Skid-Chains, of which the following is a specification.

This invention relates to improvements in a fastening attachment for skid chains, and has for its object a plurality of fastening devices attached at intervals on the side sections of the chain and to which the cross links are attached and supported, and from which the cross links are attached and supported, and from which the cross links may be detached when worn and new links substituted.

The specific feature of my invention is the fastening device which will be fully described in detail in the following explanation.

Figure 1, is a side view of a portion of an automobile wheel showing the position of the skid chain and the application of my fastening devices.

Fig. 2, is a cross sectional view of a wheel and tire showing the position of the skid chain with the application of my fastening devices.

Fig. 3, is a detail perspective view of my improved fastening device.

Fig. 4, is a side view of the same.

Fig. 5, is a detail view of a portion of a skid chain showing the position of my fastening devices and the manner of attaching the same.

Fig. 6, is a plan view of a skid chain showing the various locations at which my improvement is attached.

Referring to the drawings in detail 7 indicates an ordinary automobile wheel rim, 8 the outer casing of the tire and 9 the pneumatic tube. On this portion of the wheel is placed the skid chain so as to prevent skidding. 10 represents an ordinary link structure of skid chain the same having its cross sections 11 so attached and arranged as to fit around the periphery of the outer casing and at suitable intervals apart, these sections being the ones which contact with the road surface and this portion as well as the ordinary supporting sections of the skid chain are not considered as embodying any portion of my invention. To the ends of the cross sections of chain is attached my improved fastening device which consists of a snap or other fastening device 12 constructed preferably of durable spring material and made rigid enough to hold itself in position and prevent opening by ordinary accidental contact. This snap when made up is formed of a single wire of spring material bent to form two parallel members 13 and 14, the forward end being then bent up as that indicated by the numeral 15 and formed into a loop 16; the rear ends are rounded or bent up as that indicated by the numeral 17, the members 13 then continuing on parallel with the members 13 and 14, its end 18 being slightly upturned and fitting into the loop 16. The end of the member 14 is bent or looped around the member 13 in the fashion as that indicated by the numeral 19 and its end is then brought down on the angle so that its end 20 is in contact with both members 13 and 14. The purpose of this angular position of the end is to prevent the link 21 from at any time passing beyond the same and causing the chain or connecting links from becoming twisted or entangled.

It likewise prevents the link 22 from passing out of its position on the fastening device. This inclined section as well as keeping the links separated also acts as a suitable stripping means for the upper horizontal portion of the wire which acts as a snap section and at the same time keeps its end 18 in taut position with the loop 16.

These snaps or fastening devices are attached at intervals to the links 10 of the side chains, and to these snaps are attached and supported the ends of the cross links 11 which are arranged around the outer periphery of the tire and contact with the road surface.

In the event the links comprising the cross sections become worn, the same can be readily and easily removed from the fastening devices and a new section immediately attached to the fasteners and substituted for the old.

The ends of the skid chain proper are also provided with these improved snaps as that indicated by the numeral 23 and these snaps are then snapped into the links 24 located at the other end.

By referring to Fig. 6 which is virtually a diagrammatic view of this chain when laid out shows the number of sections 25 of the chains which pass around the tire and both ends of these sections are attached to my improved snaps which are indicated in this view by the letter X.

By equipping a skid-chain with these devices the chain is readily and easily repaired by removing a worn out section and substituting a new one in lieu thereof.

The specific feature of my invention is to equip a skid chain with fastening devices so that when a section becomes worn out a new section can be easily snapped in position without taking the chain to a repair shop, but on the contrary, placed in position while the chain is on the wheel.

Having fully described my invention what I claim is:

1. A device of the character described comprising in combination with a skid chain, of a fastening device constructed of a single strand of spring material, the said strand forming two parallel members in contact with each other, the ends of the fastening device bent forming two rounded ends of said fastening device, the one bent end formed into a loop, one of the parallel members having its one end slightly bent and fitting into the loop, the other end of the strand twisted around the upper parallel member and extended downward at an angle and in contact with the two parallel members, in combination with skid chain sections to which the fastening device is fastened for holding the same to the skid chain, substantially as specified.

2. A fastening attachment for skid chains comprising a snap constructed of a wire, said snap comprising two parallel elements, bent on each end, the one end terminating into a loop, one end of the wire resting in said loop, the other end twisted around one element and bent downwardly at an angle and acting as a support for the other end, in combination with a skid chain to which said link may be attached.

In testimony whereof, I have signed my name to this specification, in presence of two subscribing witnesses.

HARRY WHITESIDE.

Witnesses:
 ALFRED A. EICKS,
 B. AUSTINO.